US012685884B2

(12) United States Patent
Coyle et al.

(10) Patent No.: US 12,685,884 B2
(45) Date of Patent: Jul. 21, 2026

(54) ENERGY-ABSORBING UNIT FOR SELF-RETRACTING LIFELINE

(71) Applicant: 3M INNOVATIVE PROPERTIES COMPANY, St. Paul, MN (US)

(72) Inventors: Christopher W. Coyle, Eagan, MN (US); Michael N. Milbright, Red Wing, MN (US)

(73) Assignee: 3M INNOVATIVE PROPERTIES COMPANY, St. Paul, MN (US)

( * ) Notice: Subject to any disclaimer, the term of this patent is extended or adjusted under 35 U.S.C. 154(b) by 1120 days.

(21) Appl. No.: 17/767,017

(22) PCT Filed: Oct. 24, 2020

(86) PCT No.: PCT/IB2020/060005
§ 371 (c)(1),
(2) Date: Apr. 6, 2022

(87) PCT Pub. No.: WO2021/084395
PCT Pub. Date: May 6, 2021

(65) Prior Publication Data

US 2022/0362594 A1 Nov. 17, 2022

Related U.S. Application Data

(60) Provisional application No. 62/926,909, filed on Oct. 28, 2019.

(51) Int. Cl.
*A62B 35/04* (2006.01)
*A62B 35/00* (2006.01)

(52) U.S. Cl.
CPC .......... *A62B 35/04* (2013.01); *A62B 35/0093* (2013.01)

(58) Field of Classification Search
CPC ....... A62B 35/04; A62B 35/0093; F16F 7/006
USPC ...................................... 182/3, 231; 188/371
See application file for complete search history.

(56) References Cited

U.S. PATENT DOCUMENTS 4,446,944 A * 5/1984 Forrest .................. A62B 35/04 182/3
4,538,702 A 9/1985 Wolner
5,090,503 A * 2/1992 Bell ....................... A62B 35/04 182/5

(Continued)

FOREIGN PATENT DOCUMENTS

EP 2431076 A2 * 3/2012 .............. F16F 7/006
WO WO-2013063414 A2 * 5/2013 ......... A62B 35/0093

(Continued)

OTHER PUBLICATIONS

3M™ DBI-SALA®, "Smart Lock Self-Retracting Lifeline: Brochure", 2018, 3 pages.

(Continued)

*Primary Examiner* — Ryan D Kwiecinski
(74) *Attorney, Agent, or Firm* — Kenneth B. Wood

(57) ABSTRACT

An energy-absorbing unit with a first end bearing a modular connector that is disconnectably connectable to a complementary modular connector of a cable of a self-retracting lifeline, and with a second end bearing a fastener that is fastenable to a dorsal connection point of a fall-protection harness. Uses of such units in combination with self-retracting lifelines and fall-protection harnesses.

14 Claims, 4 Drawing Sheets

(56) References Cited

U.S. PATENT DOCUMENTS

| | | | | |
|---|---|---|---|---|
| 5,113,981 | A * | 5/1992 | Lantz | F16F 7/006 267/74 |
| 5,174,410 | A | 12/1992 | Casebolt | |
| 5,799,760 | A | 9/1998 | Small | |
| 6,279,680 | B1 | 8/2001 | Casebolt | |
| 6,533,066 | B1 * | 3/2003 | O'Dell | D03D 1/0005 182/4 |
| 6,648,101 | B2 * | 11/2003 | Kurtgis | A62B 35/0075 182/7 |
| 6,883,640 | B2 * | 4/2005 | Kurtgis | A62B 35/0075 182/7 |
| 6,990,928 | B2 * | 1/2006 | Kurtgis | B64D 1/22 182/36 |
| 7,114,225 | B2 | 10/2006 | Casebolt et al. | |
| 7,237,650 | B2 | 7/2007 | Casebolt | |
| 7,726,350 | B2 | 6/2010 | Jennings et al. | |
| 7,843,349 | B2 | 11/2010 | Rohlf | |
| 7,909,137 | B2 * | 3/2011 | Green | A62B 35/04 182/3 |
| 8,251,176 | B2 | 8/2012 | Meillet et al. | |
| 8,256,574 | B2 | 9/2012 | Griffiths et al. | |
| 8,430,206 | B2 | 4/2013 | Griffiths et al. | |
| 8,430,207 | B2 | 4/2013 | Griffiths et al. | |
| 8,701,826 | B2 * | 4/2014 | Smith | F16F 7/006 182/4 |
| 8,959,664 | B2 | 2/2015 | Johnson et al. | |
| 9,174,073 | B2 | 11/2015 | Casebolt et al. | |
| 9,488,235 | B2 | 11/2016 | Casebolt | |
| 9,498,659 | B2 | 11/2016 | Schurian | |
| 10,125,837 | B1 * | 11/2018 | Fegley | F16F 7/006 |
| 10,137,322 | B2 | 11/2018 | Perner | |
| 10,512,802 | B2 * | 12/2019 | Patton | A62B 35/04 |
| 10,874,886 | B2 * | 12/2020 | Bertoti | F16F 7/006 |
| 11,724,136 | B2 * | 8/2023 | Blackford | A62B 1/00 182/231 |
| 2005/0269153 | A1 * | 12/2005 | Casebolt | A62B 35/0093 182/3 |
| 2006/0048351 | A1 * | 3/2006 | Casebolt | A44B 11/253 24/634 |
| 2006/0048723 | A1 | 3/2006 | Rohlf et al. | |
| 2006/0055545 | A1 * | 3/2006 | Graef | A62B 35/0012 340/573.1 |
| 2008/0060872 | A1 * | 3/2008 | Wise | A62B 35/0006 182/3 |
| 2008/0106420 | A1 | 5/2008 | Rohlf | |
| 2012/0325586 | A1 * | 12/2012 | Meggs | B64D 11/0624 182/231 |
| 2014/0224580 | A1 * | 8/2014 | Casebolt | F16F 7/006 188/376 |
| 2016/0023024 | A1 * | 1/2016 | Casebolt | A62B 35/0075 188/376 |
| 2016/0107007 | A1 * | 4/2016 | Pollard | A62B 35/0075 182/3 |
| 2016/0220857 | A1 | 8/2016 | Rappoport et al. | |
| 2018/0178047 | A1 * | 6/2018 | Comet | A62B 35/04 |
| 2018/0304103 | A1 * | 10/2018 | Cooper | A62B 1/10 |
| 2019/0054328 | A1 * | 2/2019 | Bhaskarwar | A62B 35/0025 |
| 2019/0118011 | A1 * | 4/2019 | Patton | F16G 11/12 |
| 2019/0126079 | A1 | 5/2019 | Svoboda et al. | |
| 2020/0129791 | A1 * | 4/2020 | Mcmaster | A01M 31/02 |
| 2020/0406074 | A1 * | 12/2020 | Fjelldal | A62B 35/0043 |
| 2022/0105374 | A1 * | 4/2022 | Jacob | B65H 75/4442 |
| 2022/0362592 | A1 * | 11/2022 | Clark | B63B 23/44 |
| 2022/0362594 | A1 * | 11/2022 | Coyle | A62B 35/0093 |
| 2024/0161593 | A1 * | 5/2024 | Lepp | B66F 9/24 |

FOREIGN PATENT DOCUMENTS

| | | | | |
|---|---|---|---|---|
| WO | WO-2017078669 | A1 * | 5/2017 | A62B 35/04 |
| WO | WO-2021035327 | A1 * | 3/2021 | B63C 9/26 |
| WO | WO-2023031263 | A1 * | 3/2023 | A62B 35/04 |

OTHER PUBLICATIONS

3M™ Fall Protection, "Product Advisory—Use of Dorsal D-Ring Extenders in Leading-Edge Applications". Jan. 14, 2019, 1 page.

DBI-SALA®, "Leading the Way in Fall Protection for Electrical Utilities", Electrical Utilities Catalog, Form: 9700934, Rev: B, 2014, pp. 1-32.

DBI-SALA®, "Lanyards with Integral Energy Absorbers and Energy Absorber Components Used in Personal Fall Arrest Systems—User Instruction Manual", Form No. 5903326C Rev: A, 2013, 16 pages.

DBI-SALA®, "Uni 8™ Overhead Technical Datasheets", No. 1, 2013, pp. 1-27.

DBI-SALA®, Zorbit Energy Absorber Kits—User Instruction Manual, 2005, pp. 1-12.

FALLTECH®, "D-Ring Extender—User Instruction Manual", MDRE01 Rev C, 122818, (date unknown but believed to be prior to the date of the filing of the present application), pp. 1-15.

International Search Report for PCT Application No. PCT/IB2020/060005, mailed on Jan. 29, 2021, 3 pages.

Reliance™ Fall Protection, "Instructions for Use—88004X Series D-Ring Extender", T353011, Rev B, 2010, pp. 1-12.

Web Devices Fall Arrest Systems, "Harness D-Ring Extender Instructions—Manual", (date unknown but believed to be prior to the date of the filing of the present application), 2 pages.

* cited by examiner

ENERGY-ABSORBING UNIT FOR SELF-RETRACTING LIFELINE

BACKGROUND

Fall-protection apparatus such as e.g. self-retracting lifelines have often found use in applications such as building construction and the like.

SUMMARY

In broad summary, herein is disclosed an energy-absorbing unit with a first end comprising a modular connector that is disconnectably connectable to a complementary modular connector of a cable of a self-retracting lifeline, and with a second end comprising a fastener that is fastenable to a dorsal connection point of a fall-protection harness. Also disclosed are the use of such units in combination with self-retracting lifelines and fall-protection harnesses. These and other aspects will be apparent from the detailed description below. In no event, however, should this broad summary be construed to limit the claimable subject matter, whether such subject matter is presented in claims in the application as initially filed or in claims that are amended or otherwise presented in prosecution.

Like reference numbers in the various figures indicate like elements. Some elements may be present in identical or equivalent multiples; in such cases only one or more representative elements may be designated by a reference number but it will be understood that such reference numbers apply to all such identical elements. Unless otherwise indicated, all figures and drawings in this document are not to scale and are chosen for the purpose of illustrating different embodiments of the invention. In particular the dimensions of the various components are depicted in illustrative terms only, and no relationship between the dimensions of the various components should be inferred from the drawings, unless so indicated.

Terms such as "first" denote an item that is located closer to a base unit and housing of a self-retracting lifeline. Terms such as "second" denote an item that is located (relative to a similar item that is termed a "first" item) farther from the base unit of the self-retracting lifeline.

Terms such as connect, connector, connected, connection, and the like, denote items that can be connected to each other reversibly and repeatedly so that the items can be disconnected from each other and reconnected to each other as many times as desired.

The term modular connector denotes a connector that is specifically configured so that it can be reversibly and repeatably joined to, and disconnected from, to a complementary modular connector. Modular connectors often are provided in complementary pairs, e.g. a "male" connector and a "female" connector. For a complementary pair of modular connectors, often one, and sometimes both, of the connectors, will not be connectable to any connector other than the modular connector that is complementary to it, in ordinary use of the modular connectors according to instructions provided for their use.

The term fastener is used to denote any connector that is "universal" in application rather than being a modular connector. The term fastener encompasses e.g. hooks (for example snap hooks), carabiners, and so on.

Terms such as "attach", "attached", and the like, denote items that are permanently joined to each other so that they cannot be detached from each other by a user during ordinary use of the items without destroying or severely damaging at least one of the items. A condition in which two items are attached to each other is thus distinguished from a condition in which two items are connected to each other.

Terms such as "vertical", "up", "upward", "down", "downward", and the like have their ordinary meaning with reference to a fall-protection safety harness worn by a human user standing upright.

The term "configured to" and like terms is at least as restrictive as the term "adapted to", and requires actual design intention to perform the specified function rather than mere physical capability of performing such a function.

DETAILED DESCRIPTION

Figure 1:
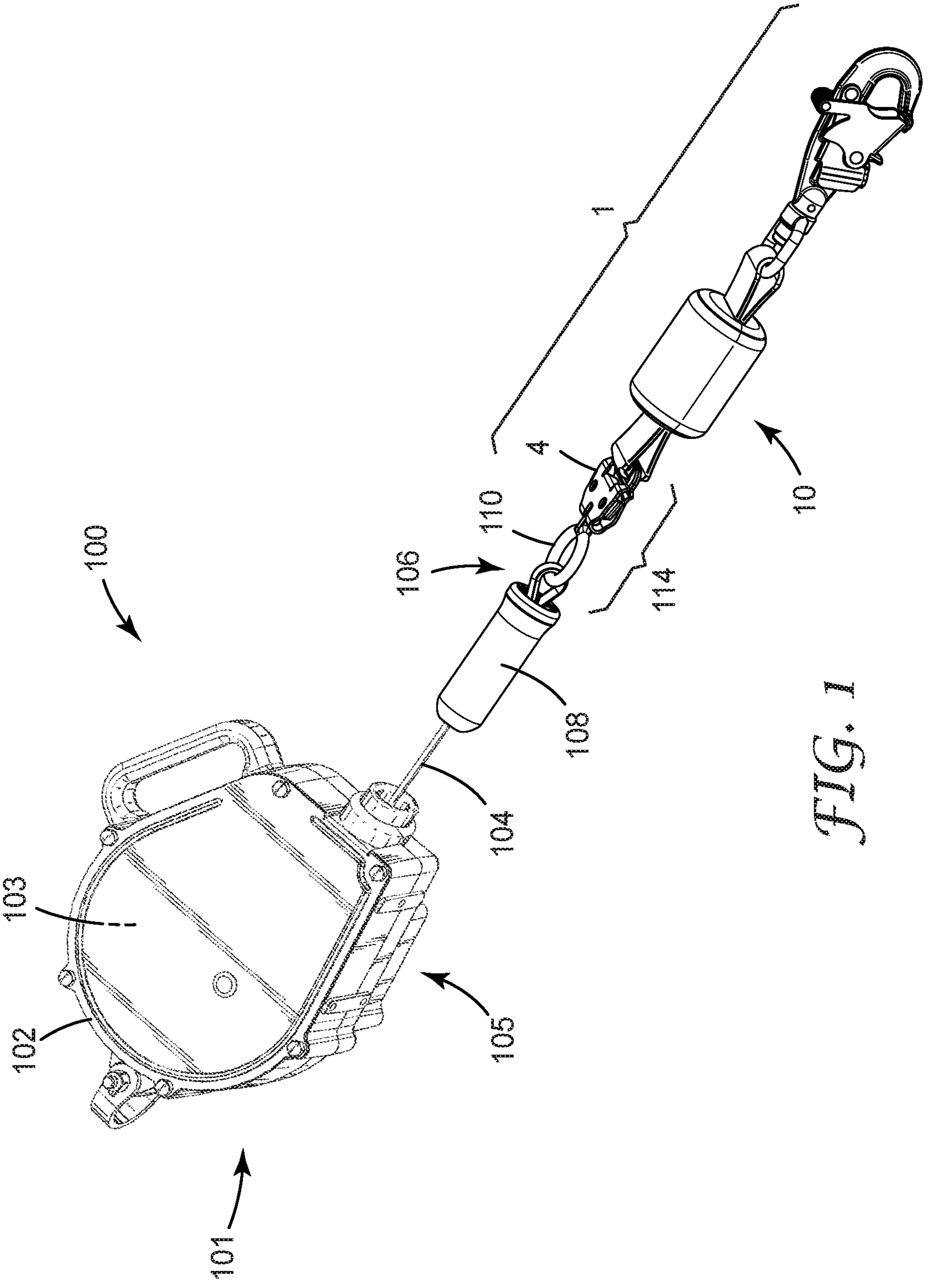
FIG. 1 is a side perspective view of an exemplary self-retracting lifeline and an exemplary energy-absorbing unit connected to a cable of the self-retracting lifeline.

Disclosed herein is an energy-absorbing unit 1 configured for use with a self-retracting lifeline ("SRL") 100, as shown in exemplary embodiment in FIG. 1. A self-retracting lifeline 100 is a fall-protection apparatus that comprises a load-bearing line (referred to herein as a "cable") 104 that can be unwound from a base unit 101 which may be secured to any suitable anchorage of a worksite. Typically, base unit 101 will comprise a housing 102 which protects and supports a reel 103 (indicated generally in FIG. 1) that is rotatably mounted within the housing and to which a first end 105 of cable 104 is attached. Cable 104 can be unwound from reel 103 and thus extended from housing 102 to follow a user as the user moves about, with reel 103 being biased so that the reel retracts cable 104 back into housing 102 and rewinds it onto the reel as the user moves toward base unit 101. A self-retracting lifeline (e.g., housing 102 and reel 103 thereof) includes a brake (e.g. comprising centrifugally-activated pawls that act in cooperation with a friction pad or the like) that is triggered in the event of a user fall (e.g. upon rapid unwinding of cable 104) to safely bring the user to a halt. Fall-protection apparatus such as self-retracting lifelines and components and functioning thereof are described in various aspects e.g. in U.S. Pat. Nos. 7,843,349, 8,256,574, 8,430,206, 8,430,207, and 9,488,235, all of which are incorporated by reference in their entirety herein. In some embodiments a self-retracting lifeline will meet the requirements of ANSI Z359.14-2014.

Cable 104 of self-retracting lifeline 100 may take any suitable form as long as it is load-bearing. By load-bearing is meant that in ordinary use of a self-retracting lifeline 100 with which cable 104 is used, cable 104 is capable of bearing a load imparted by a human user (e.g. an adult human weighing at least 150 pounds) of the fall-protection apparatus. It will be appreciated that in some circumstances (e.g., when used to arrest a fall), cable 104 may at least momentarily bear a dynamic load that is somewhat, or even substantially, greater than the actual weight of the human user.

Cable 104 may take any form and may be made of any suitable material. In some embodiments, cable 104 may be a metal cable, e.g. a twisted or braided metal cable (often referred to as a wire rope). Suitable materials for a metal cable may include e.g. stainless steel and galvanized steel. In other embodiments, cable 104 may take the form of a rope comprised of twisted or braided organic polymeric strands, plies, or fibers. In many embodiments, cable 104 may exhibit an at least generally circular cross-section. However, the term cable is used broadly and does not necessarily imply any particular composition or geometry, as long as the cable is load-bearing as described above.

Cable 104 may have any suitable length. In various embodiments, cable 104 may have a total length that is at least about 10, 15, 25, 35, 45, or 55 feet; in further embodiments, the total length may be no more than about than 20, 30, 50, 100, 150, 200, 300, or 500 feet. In various embodiments, cable 104 may exhibit a minimum breaking strength of at least about 310, 900, 1800, 3600, 5000, 5400, 7000, or 9000 $lb_f$.

In the herein-disclosed arrangement, a second end 106 of cable 104 of self-retracting lifeline 100 (i.e., the end of cable 104 that is distal to base unit 101) is not attached to a "universal" or generic connector such as e.g. a hook, carabiner or the like. Rather, second end 106 of cable 104 is attached to a first modular connector 110 that is configured to be connectable to a second modular connector 4 of an energy-absorbing unit 1 as shown in exemplary embodiment in FIG. 1. This allows the energy-absorbing unit 1 to be connected to end 106 of cable 104 so that energy-absorbing unit 1 can, at certain times, function essentially as a part of cable 104, to achieve the arrangements and advantages discussed herein.

Second end 106 of cable 104 may be attached to first modular connector 110 in any suitable manner, as long as the attachment is permanent. For example, a terminal section of second end 106 of cable 104 may be passed through a through-passage 113 of modular connector 110 and turned back onto itself to form a terminal loop 107 at second end 106 of cable 104, as visible in FIG. 3. The terminal section of cable 104 may be brought into close abutment with (e.g. brought into contact with) a penultimate section of cable 104 and affixed or otherwise attached to thereto. In some embodiments one or more fittings may be used for this purpose, e.g. a compression fitting in the form of a sheath, ferrule, or swage fitting (made e.g. of any suitable metal, e.g. steel or the like). Exemplary compression fittings that may be suitable include products available under the trade designation NICOPRESS.

If desired, in some embodiments a thimble (an arcuate, protective channel) may be provided along at least some interior portions of a thus-formed terminal loop 107 of cable 104 e.g. for enhanced abrasion resistance. If desired, in some embodiments a protective shroud 108 may be provided at second end 106 of cable 104. Such a shroud can, for example, allow a user to grasp end 106 of cable 104 without coming into contact with any fittings, exposed cable-ends, and so on, that might be present. Such a shroud can also serve as a "bumper" to prevent modular connector 110 (or, in general, any item at second end 106 of cable 104) from entering housing 102 of base unit 101 in the event that cable 104 is fully retracted into the housing. In many embodiments, such a shroud may be made of e.g. a molded plastic material.

Figure 2:
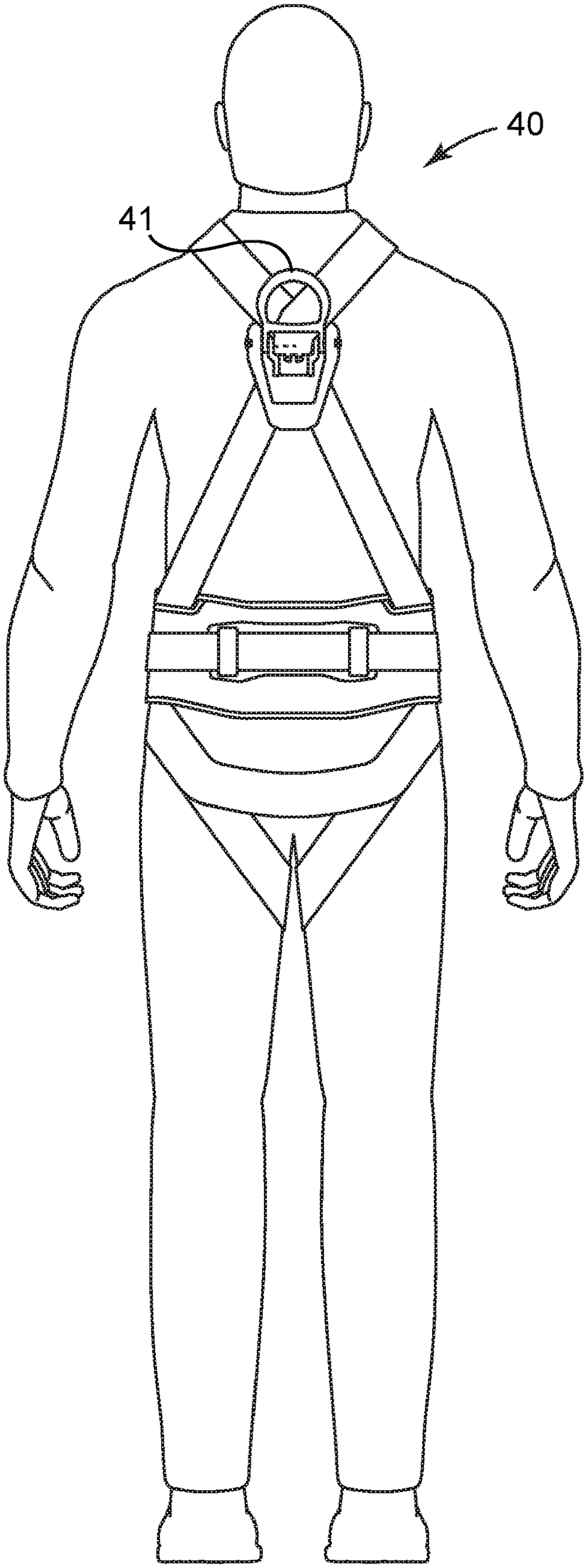
FIG. 2 is a rear view of an exemplary fall-protection harness to which an energy-absorbing unit can be connected.

A self-retracting lifeline 100 as disclosed herein is used in combination with a harness 40 as shown in exemplary embodiment in FIG. 2. (Cable 104 of self-retracting lifeline 100 will be connected to harness 40 by way of an energy-absorbing unit 1 as discussed in detail herein.) A harness 40 is configured to be worn by a human user of the self-retracting lifeline and is typically a full-body harness. As illustrated in generic representation in FIG. 2, such a harness will often comprise first and second shoulder straps that extend over the top of the shoulders, and a waist strap that encircles the waist/hip area of the user. Such straps are typically comprised of flat webbing, made of e.g. woven synthetic fabric comprising fibers of organic polymers such as e.g. polyamides, polyaramids (e.g. as available under the trade designations TECHNORA, KEVLAR or NOMEX), ultra-high molecular weight polyethylene (such as e.g. Dyneema), polyester (e.g. fibers available under the trade designation VECTRAN), and so on. As will be well understood, such straps (and other straps such as e.g. leg or thigh straps as may be present) are interconnected with each other and are often fitted with various pads (e.g. shoulder pads and waist/hip pads) to enhance the comfort of the harness, as well as various buckles, latches, connectors, loops, guides, additional pads such as e.g. chest pads and/or leg pads, and so on. Such components and exemplary arrangements of such components are described in, for example, U.S. Pat. Nos. 8,959,664, 9,174,073, and 10,137,322, all of which are incorporated by reference in their entirety herein. It will be understood that the particular arrangements of FIG. 2 is an exemplary representation; in actuality a fall-protection harness may vary from the exact arrangements shown in these Figures.

Whatever the design, many such harnesses are configured so that the shoulder straps meet, overlap and/or cross each other at a dorsal area located generally toward the middle of the users back, e.g. between portions of the shoulder blades. A dorsal connection point 41 is typically provided at this location, attached (directly or indirectly) to the shoulder straps and optionally supported by a dorsal plate and/or accompanied by a dorsal pad to enhance the user's comfort. In many convenient embodiments, a dorsal connection point 41 can take the form of a D-ring (e.g. comprised of metal such as steel, aluminum, any suitable alloy, and so on, so as to exhibit appropriate strength and durability). The term D-ring is a term of art in common use and artisans in the field will appreciate that such an item may vary in size, shape, geometry, and so on. In other embodiments, a dorsal connection point may be provided e.g. as a loop of synthetic polymeric material that exhibits suitable properties.

A dorsal connection point 41 provides a convenient point at which an end of a cable of a self-retracting lifeline can be connected to the harness. Connecting the cable to the harness at this location can provide that, as a user goes about work activities, the cable remains generally behind the user's back so that it does not unduly interfere with the work activities.

Disclosed herein is an energy-absorbing unit 1 that is connectable to second end 106 of cable 104. Energy-absorbing unit 1 comprises an energy absorber 10. To a first end 12 of energy absorber 10 is attached a second modular connector 4 that allows a first end 2 of unit 1 to be connected to second end 106 of cable 104. (The first modular connector 110 provided at second end 106 of cable 104, and the second modular connector 4 provided at first end 2 of energy-absorbing unit 1, thus constitute a complementary pair of modular connectors.) To a second, opposing end 13 of energy absorber 10 is attached a fastener that allows a second end 3 of unit 1 to be connected to a dorsal connection point (e.g., a D-ring) 41 of a fall-protection harness 40. Fastener 6 is not modular (i.e., is not configured so that it is connectable only to a particular connector to which it is complementary) but rather may be e.g. a hook or the like.

An energy absorber 10 of energy absorbing unit 1 may take any suitable geometric form, may operate by any suitable mechanism, and may be made of any suitable material or materials. In many convenient embodiments, an energy absorber 10 may comprise an arrangement in which at least one elongate length of webbing 14 is arranged so that when sufficient tensile force is applied to the length of webbing, the webbing deforms or otherwise changes shape and/or character in a controlled manner. This can allow that, in the event of a worker fall, the worker is brought to a halt in a more gradual manner. In some circumstances, an energy absorber 10 (sometimes referred to as a "shock absorber" or "shock pack") may work in concert with, or as an adjunct to, a centrifugal brake with which the self-retracting lifeline is equipped in the manner mentioned previously herein. However, in some circumstances (e.g. if the worker falls, e.g. over an edge, in such manner that the cable is e.g. caught or snagged), energy absorber 10 may be the primary mechanism by which the fall is controllably arrested.

In many convenient embodiments, an energy absorber 10 may be provided by obtaining an elongate length of webbing 14 and, over at least one elongate portion of the webbing, folding the webbing upon itself multiple times to form overlapping sections. Such folding may be referred to e.g. as Z-folding, fan-folding, accordion-folding, and so on. At least some of these overlapping sections may then be joined to each other (e.g. by stitching). The stitching or other joining mechanism is configured so that upon application of sufficient tensile force to the ends of the webbing, the sections will be torn apart or otherwise separated from each other (such energy absorbers are sometimes referred to as "tear strips".) This process can provide the desired energy absorption. The folded/overlapping sections 15 are frequently covered by a shroud (e.g. a fabric cover) in the general manner depicted in FIG. 3.

The actual arrangement of folded sections 15 of webbing 14 in such an energy absorber may vary. For example, one exemplary arrangement that may be suitable is disclosed in FIG. 1 of U.S. Patent Application Publication 2006/0048723, which document is incorporated by reference in its entirety herein. Various other potentially suitable arrangements of energy absorbers are described e.g. in U.S. Pat. Nos. 4,538,702, 5,174,410, 9,498,659, and 10,125,837, all of which are likewise incorporated by reference in their entirety herein. In many convenient embodiments, folded sections of an energy absorber may be joined to each other by stitching as noted above. However, in some embodiments, some other means (e.g. adhesives, and/or mechanical fasteners such as staples or the like) may be used as an adjunct to, or instead of, the use of stitching.

Figure 3:
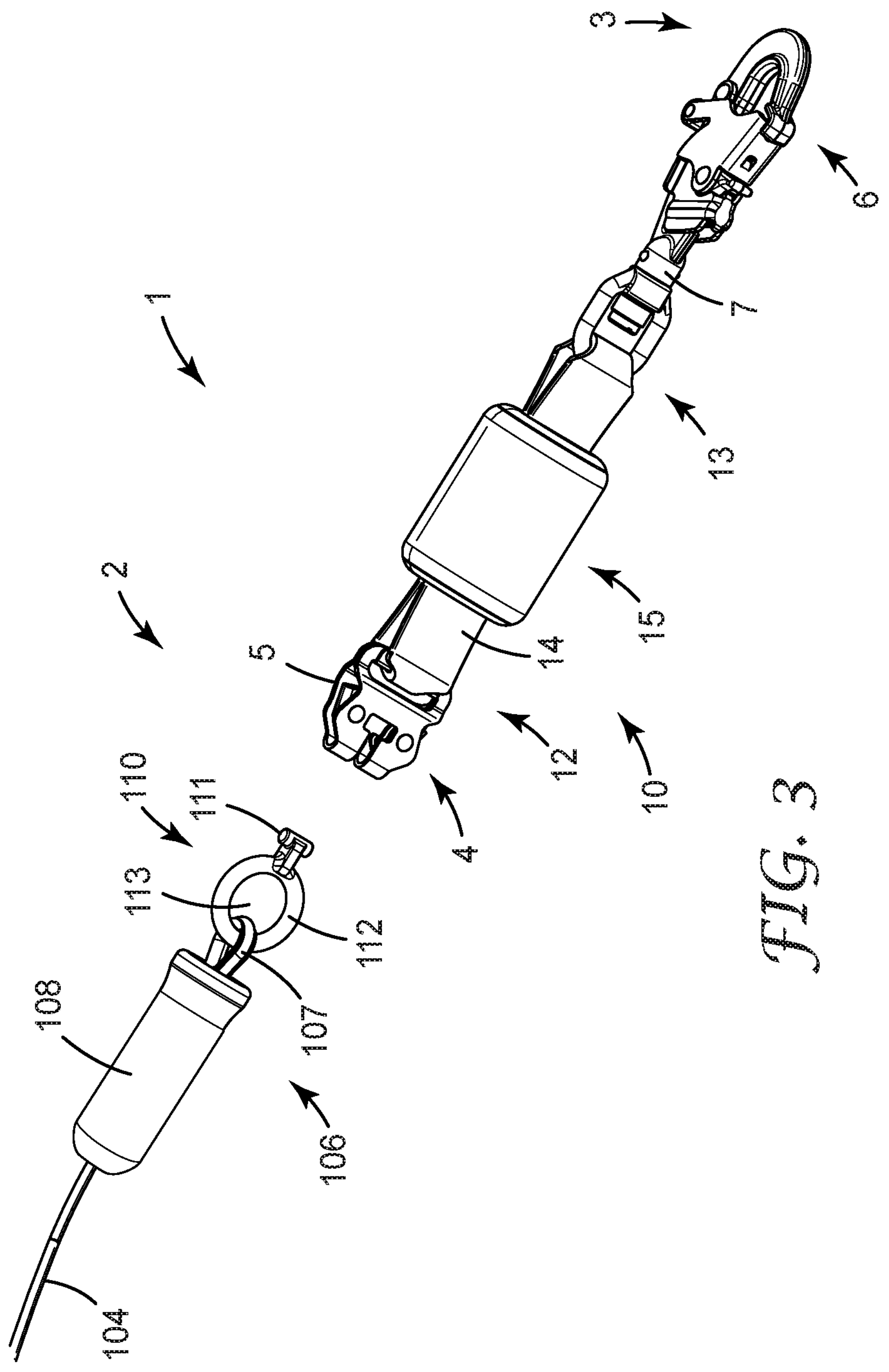
FIG. 3 is a side perspective view of an end of a cable of a self-retracting lifeline, and an exemplary energy-absorbing unit that can be connected to the end of the cable.

In some embodiments, portions of webbing 14 may protrude from the folded/overlapping sections 15 in the general manner shown in FIG. 3. First and second ends 12 and 13 of the webbing may be respectively attached to second modular connector 4 and to fastener 6 as shown in FIG. 3. In some embodiments this may be achieved by passing the webbing through a through-opening of the second modular connector (or of the connector) and turning the webbing back on itself and attaching it to itself (e.g. by permanent stitching) in the general manner shown in FIG. 3. The webbing of an energy absorber 10 may be comprised of any suitable material, e.g. chosen from any of the organic polymeric materials described previously herein.

It will be appreciated that the above arrangements are exemplary. In alternative embodiments, an energy absorber 10 may rely on at least some metal components rather than e.g. stitched-together sections of organic polymeric webbing. For example, an energy absorber may rely on a length of suitable material, e.g. metal, arranged in a coil that can be uncoiled upon the application of a sufficiently high tensile force. Energy absorbers of this general type are available from 3M Fall Protection under the trade designation ZORBIT. Energy absorbers of this general type are also described in U.S. Pat. No. 6,279,680. As an alternative, or in combination, an energy absorber may include a length of metal arranged in a generally zig-zag shape that can be straightened upon the application of a sufficiently high tensile force. Energy absorbers of this general type are described in 3M Fall Protection Technical Datasheet 866 (Part No. 7241073).

It will thus be appreciated that an energy absorber may take any suitable form, and may rely on any suitable energy-absorbing mechanism, for example involving e.g. controlled release of attached layers from each other, frictional forces, or any combination thereof.

Any such arrangement will provide an energy absorbing unit 1 that comprises an energy absorber 10, a second modular connector 4, and a fastener 6, with modular connector 4 and fastener 6 respectively providing first end 2 and second end 3 of the energy absorbing unit.

Second modular connector 4 of energy-absorbing unit 1 is configured to be connectable to first modular connector 110 that is attached to end 105 of cable 104 of self-retracting lifeline 100. As noted, such modular connectors are often used in pairs and are complementary; that is, they are specifically configured to be mateable or otherwise engageable with each other to as to form a connection therebetween. When two such connectors 4 and 110 are engaged to each other so as to become connected to each to each other, they form a modular connection 114 as indicated in FIG. 1.

In some embodiments, such a pair of complementary modular connectors may be the general type disclosed in U.S. Pat. No. 7,114,225, which is incorporated by reference in its entirety herein. In the embodiment disclosed herein (as seem most easily in FIG. 3), a first modular connector 110 may be a "male" connector comprising a base 112 with a member (e.g. a T-bar) 111 protruding therefrom. In some embodiments, base 112 may take the general form of a loop (which need not necessarily be strictly circular in shape) that defines a through-passage 113 therein. (Such a loop and the through-passage defined thereby may provide a convenient way to attach an end of cable 104 of a self-retracting lifeline 100 to connector 110.)

Such a connector 110 may be used in combination with a "female" connector 4 that comprises a slot into which the T-bar member of the male connector may be inserted and locked.

In some embodiments, first and second modular connectors 4 and 110 may be configured to allow automatic engagement of the first and second connectors into a connected condition. By this is meant that pressing the T-bar member into the slot is sufficient to allow the T-bar member to become seated in the slot and then be held securely there. This may be achieved, for example, by providing one or more biased pawls that deflect to allow the T-bar member to move past and then return to a position that locks the T-bar member in place.

In some embodiments, the modular connectors may be configured to require second modular connector 4 to be actuated into an unlocked state before the first and second modular connectors can be disengaged into a disconnected condition. For example, an actuator (e.g. paired actuators 5, of which a portion of one such actuator is visible in FIG. 3)

may need to be pressed or otherwise moved in order to unlock the above-described pawls to allow the T-bar member to be removed from the slot. In other words, in some embodiments such connectors may automatically lock together when engaged with each other, in a way that ensures they cannot be disengaged from each other without a prior, purposeful actuation that places at least one of the connectors into a condition that allows the connectors to be disengaged from each other.

In many embodiments, at least some components of modular connectors 4 and 110 may be made of metal, e.g. steel or the like. In some embodiments, a through-passage may be provided in a portion of second modular connector 4 to allow webbing 14 of energy-absorbing unit 1 to pass therethrough and to be turned on itself and attached thereto (e.g. by permanent stitching), so as to attach second modular connector 4 to first end 12 of energy absorber 10. Similarly, a through-passage may be provided in fastener 6 to allow webbing 14 to pass therethrough in order to attach fastener 6 to second end 14 of energy absorber 10. Both of these arrangements are illustrated in exemplary embodiment in FIG. 3. Although FIGS. 1 and 3 depict an arrangement in which a "male" modular connector 110 is provided at end 106 of cable 104 and a complementary "female" modular connector 4 is provided at end 2 of energy-absorbing unit 1, in some embodiments this arrangement can be reversed. (Furthermore, in some embodiments such modular connectors do not necessarily have to be in "male" and "female" forms.)

As noted, energy-absorbing unit 1 comprises a fastener 6, located at a second end 3 of energy-absorbing unit 1. Fastener 6 allows second end 3 of unit 1 (and thus cable 104 of self-retracting lifeline 100) to be connected to any desired item, e.g. to a dorsal connection point of a harness of a user of self-retracting lifeline 100. A fastener 6 may take any suitable form, e.g. a hook such as a snap hook, a carabiner, a D-ring, a loop of suitable webbing, and so on. In some embodiments fastener 6 may comprise a hook portion and a hingedly openable (e.g., thumb-or finger-actuatable) gate, as shown in exemplary embodiment in FIG. 3. In some embodiments fastener 6 may be self-engaging (e.g. a snap hook), meaning that fastener 6 may be engaged to a component (e.g. a D-ring) of a harness merely by appropriately pressing a hingedly openable gate of the fastener 6 against the component. In many embodiments, such a fastener may be self-locking if the hinged gate is biased (e.g. spring-loaded) to snap shut after allowing passage of a component through the gap created when the gate is opened. Many such fasteners may allow one-handed operation. If desired, one or more rotatable (swivelable) junctions 7 may be provided (e.g. between an eyebolt of fastener 6 and a hook portion of fastener 6), so that the hook portion can rotate freely about an axis of rotation that is aligned with a long axis of the hook as necessitated e.g. by movements of a user. In many embodiments, at least some components of fastener 6 may be made of metal, e.g. steel or the like. In some embodiments, a through-passage may be provided in a portion of fastener 6 (e.g. fastener 6 may take the form of a hook that is joined to an eyebolt that defines a through-passage, as in FIG. 3). This can allow webbing 14 of energy-absorbing unit 1 to pass through the through-passage and to be turned on itself and attached thereto (e.g. by permanent stitching), so as to attach fastener 6 to second end 13 of energy absorber 10, as mentioned above.

The arrangements described herein will provide an energy absorbing unit 1 that comprises an energy absorber 10, a second modular connector 4, and a fastener 6, with modular connector 4 and fastener 6 respectively providing first end 2 and second end 3 of the energy absorbing unit. In some embodiments, such an energy-absorbing unit can be provided as a component of a self-retracting lifeline 100 in the general manner depicted in FIG. 1. That is, the energy-absorbing unit can effectively serve as a terminal portion of the cable of the lifeline, with a fastener (e.g. a snap hook) 6 of energy-absorbing unit 1 being connected to a dorsal connection point of a fall-protection harness 40.

However, in contrast to conventional self-retracting lifelines (e.g. that might include an integrated energy absorber that cannot be removed from the cable of the self-retracting lifeline), in the present arrangement the energy-absorbing unit 1, being reversibly connected to second end 106 of cable 104 via modular connection 114, can be disconnected from cable 104 when desired. Thus, energy-absorbing unit 1 may be disconnected from cable 104 e.g. for return to the factory for inspection or servicing, without requiring that the entire self-retracting lifeline 100 must be returned to the factory for such inspection or servicing (and vice-versa).

The arrangements disclosed herein provide further advantages. As mentioned earlier, a dorsal connection point (e.g. a D-ring) 41 of a harness is often the location of choice for connecting a cable to the harness, so that the cable remains generally behind the wearer so as to not interfere with work activities. However, since the dorsal connection point 41 is located at the small of the wearer's back, it may be difficult to connector a fastener (e.g. a snap hook) to the dorsal connection point, thus the wearer may require the assistance of another person to perform the connection.

Figure 4:
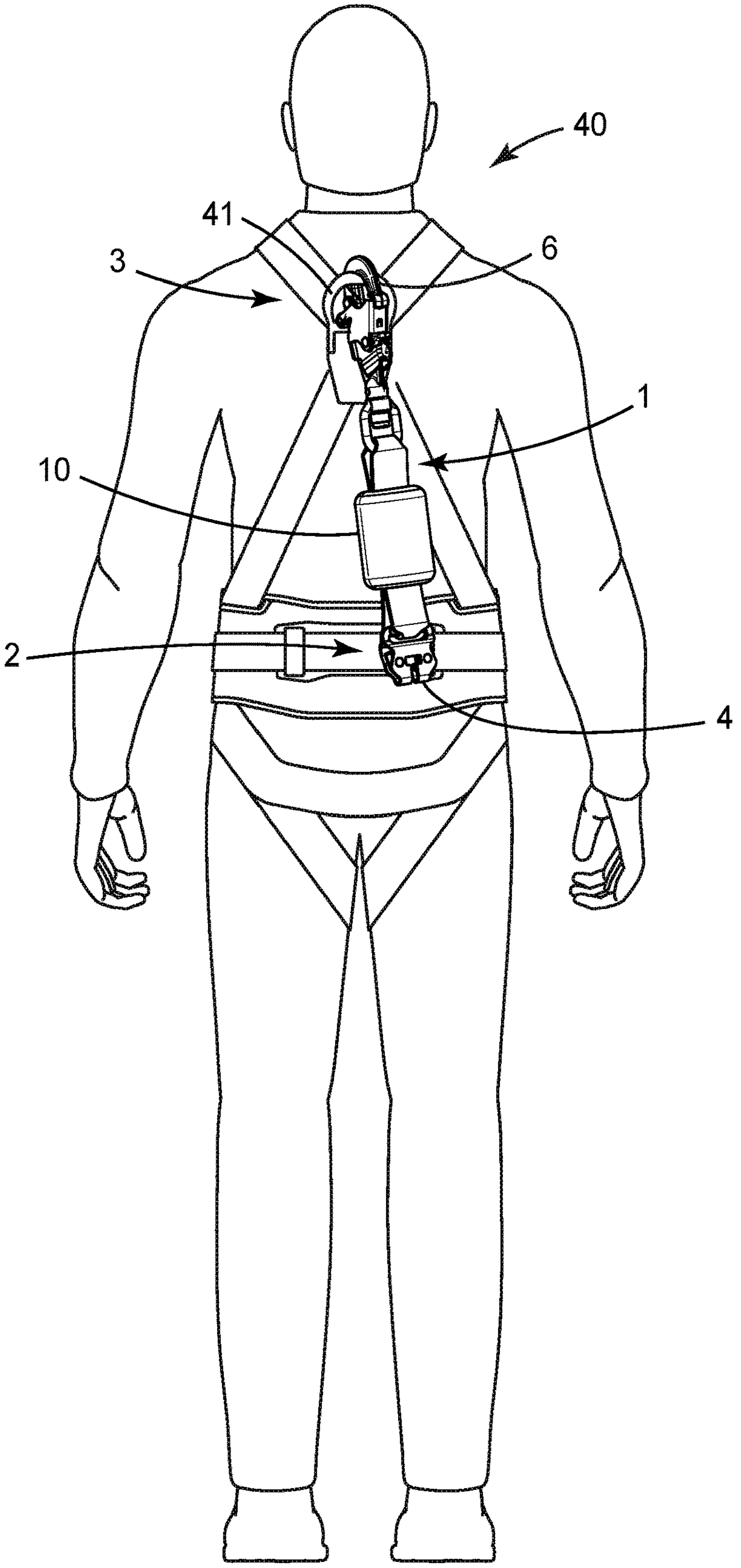
FIG. 4 is a rear view of an exemplary fall-protection harness with an exemplary energy-absorbing unit connected to a dorsal connection point (in this case, a D-ring) thereof.

According to the arrangements disclosed herein, once an energy-absorbing unit 1 is connected by its fastener 6 to a dorsal connection point of a harness 40, the energy-absorbing unit 1 may remain connected to the harness in this manner. When the services of the self-retracting lifeline are no longer required, first and second modular connectors 4 and 110 may be disconnected from each other (e.g. as shown in FIG. 3). The energy-absorbing unit 1 will then remain in place, connected to the dorsal connection point (e.g. a dorsal D-ring) 41, and hanging down behind the wearer where it will not interfere with the wearer's activities, in the general manner depicted in FIG. 4. The wearer may then carry on with particular activities (e.g. those for which fall protection is not required) up until such time as the self-retracting lifeline 100 is to be used for fall protection. At this time the user can then reconnect the modular connectors 4 and 110 to each other.

The length of energy-absorbing unit 1 (i.e., the total length, including fastener 6 and modular connector 4) will be configured to allow that first end 2 of unit 1 can easily be connected to a cable 104 of a self-retracting lifeline. In other words, unit 1 will be sufficiently long that that a wearer can momentarily manipulate second modular connector 4 e.g. around the side of the wearer's hip so as to easily be able to connect second modular connector 4 of unit 1 to a first modular connector 110 of an end of a cable 104 of a self-retracting lifeline. In various embodiments, the total length of an energy-absorbing unit may be at least 8, 10, 12, 14, or 16 inches. In further embodiments, the total length of an energy-absorbing unit may be at most 24, 22, 20, 18, or 16 inches.

Thus, not only can an energy-absorbing unit 1 provide the desired energy absorption in the event of a user fall, the unit can remain connected to the dorsal connection point 41 of a user's (wearer's) harness 40 e.g. throughout an entire workday. Cable 104 can be connected to the first end of unit 1, and disconnected therefrom, as often as needed during this time. Such an arrangement can substantially minimize any need to connect cable 104 to, and disconnect cable 104 from, a dorsal connection point e.g. multiple times throughout a workday. Rather, unit 1 can remain in place, connected e.g. to a dorsal D-ring, the entire day if desired. (In fact, unit 1 may remain connected to the dorsal connection point even after the harness is removed at the end of the workday.)

It is further noted that an energy-absorbing unit that is connectable to a harness and to an end of a cable of a self-retracting lifeline as disclosed herein, can advantageously position an energy absorber proximate the harness in such manner as can, for example, allow the self-retracting lifeline and the energy-absorbing unit connected thereto to meet the requirements for a leading-edge self-retracting lifeline (SRL-LE), as described in ANSI Z359.14-2014, section 4.1.10.

The modular approach disclosed herein brings additional advantages. For example, multiple self-retracting lifelines may be installed at various locations of a worksite. As a worker moves about the worksite, the worker does not have to remove and re-don the harness, or disconnect the energy absorbing unit from the harness. Rather, the worker can simply disconnect the energy-absorbing unit from the cable of a first self-retracting lifeline, and then connect the unit to the cable of a second, different self-retracting lifeline (that is likewise equipped with the appropriate modular connector). This process may be repeated with as many self-retracting lifelines as desired.

In some embodiments, a self-retracting lifeline 100 may be supplied to an end user with an energy-absorbing unit 1 already connected to a cable of the self-retracting lifeline. In further embodiments, one or more additional energy-absorbing units 1 may be also supplied (e.g. as spares, or replacements, or to supply multiple workers), that are not connected to the cable (or to any component or portion) of the self-retracting lifeline. Thus, an end-user may be supplied with a kit comprising e.g. one energy-absorbing unit that is connected to a cable of a self-retracting lifeline, along with one or more additional units that, while they may be packaged together with the self-retracting lifeline, are not connected to it.

It is emphasized that a user of any fall-protection device, apparatus, system, or component thereof described herein is tasked with carrying out any appropriate steps, actions, precautions, operating procedures, etc., as required by applicable laws, rules, codes, standards, and/or instructions. That is, under no circumstances will the presence of any arrangement disclosed herein relieve a user of the duty to follow all appropriate laws; rules; codes; standards as promulgated by applicable bodies (e.g. ANSI); instructions as provided by the manufacturer of the fall-protection system, apparatus or components; instructions as provided by the entity in charge of a worksite, and so on.

Exemplary Embodiments and Combinations

A first embodiment is a self-retracting lifeline fall-protection apparatus comprising: a base unit comprising a housing and a reel that is rotatably connected to the housing; a load-bearing cable with a first end that is attached to the reel of the base unit of the self-retracting lifeline and with a second end that is attached to a first modular connector; and, an energy-absorbing unit comprising an energy absorber with a first end to which is attached a second modular connector that is disconnectably connected to the first modular connector and with a second, opposing end to which is attached to a fastener that is configured to be fastened to a dorsal connection point of a fall-protection harness.

Embodiment two is the self-retracting lifeline of embodiment 1 wherein the energy absorber comprises at least one elongate length of webbing comprising at least one elongate portion that is folded upon itself multiple times to form overlapping sections at least some of which are joined to each other.

Embodiment 3 is the self-retracting lifeline of embodiment 2 wherein the overlapping sections that are attached to each other are joined to each other by stitching.

Embodiment 4 is the self-retracting lifeline of any of embodiments 2-3 wherein a first terminal portion of a first end of the elongate length of webbing passes through a through-opening of the second modular connector and is turned back on itself and attached to itself thereby causing the second modular connector to be attached to the first end of the energy absorber.

Embodiment 5 is the self-retracting lifeline of any of embodiments 2-4 wherein a second terminal portion of a second, opposing end of the elongate length of webbing passes through a through-opening of the fastener and is turned back on itself and attached to itself thereby causing the fastener to be attached to the second end of the energy absorber.

Embodiment 6 is the self-retracting lifeline of any of embodiments 1-5 wherein the fastener that is attached to the second end of the energy absorber is a hook.

Embodiment 7 is the self-retracting lifeline of any of embodiments 1-6 wherein the dorsal connection point comprises a dorsal D-ring.

Embodiment 8 is the self-retracting lifeline of any of embodiments 1-7 wherein the first modular connector is a male modular connector and the second modular connector is a female modular connector.

Embodiment 9 is the self-retracting lifeline of embodiment 8 wherein the first modular connector comprises a loop portion from which a male member of the first, male modular connector extends, wherein the loop portion defines a through-opening, and wherein a terminal portion of the second end of the cable passes through the through-opening of the loop portion and is turned back on itself and attached to itself thereby causing the second end of the cable to be attached to the first, modular connector.

Embodiment 10 is the self-retracting lifeline of any of embodiments 1-9 wherein the first and second modular connectors are configured to allow automatic engagement of the first and second connectors into a connected condition and to require the second modular connector to be actuated into an unlocked state before the first and second modular connectors can be disengaged into a disconnected condition.

Embodiment 11 is the self-retracting lifeline of any of embodiments 1-7 wherein the first modular connector is a female modular connector and the second modular connector is a male modular connector.

Embodiment 12 is the self-retracting lifeline of any of embodiments 1-11 wherein the energy-absorbing unit is configured to comprise a total elongate length, including the length of the energy absorber, the second modular connector and the fastener, of from 8 inches to 24 inches.

Embodiment 13 is a fall-protection system comprising the self-retracting lifeline of any of embodiments 1-12 and a fall-protection harness configured to be worn by a human user, wherein the fastener of the energy-absorbing unit is fastened to a dorsal connection point of the fall-protection harness so that the cable of the self-retracting lifeline is connected to the fall-protection harness.

Embodiment 14 is a kit comprising the self-retracting lifeline of any of embodiments 1-12 and further comprising at least one additional energy-absorbing unit that is identical to the energy-absorbing unit of corresponding embodiment 1-12 but that is not connected to the self-retracting lifeline.

Embodiment 15 is a method of using one or more self-retracting lifeline fall-protection apparatus, the method comprising; fastening a fastener of a second end of an energy-absorbing unit to a dorsal connection point of a fall-protection harness, a first end of the energy-absorbing unit being connected to an end of a cable of a self-retracting lifeline via a modular connection provided between a first modular connector to which the end of the cable is attached and a second modular connector to which the first end of the energy-absorbing unit is attached.

Embodiment 16 is the method of embodiment 15 further comprising the step of disconnecting the second modular connector to which the first end of the energy-absorbing unit is attached, from the first modular connector to which the end of the cable is attached, so that the energy-absorbing unit is no longer connected to the cable of the self-retracting lifeline. Embodiment 17 is the method of embodiment 16 wherein when the second modular connector is disconnected from the first modular connector, the fastener of the second end of the energy-absorbing unit remains fastened to the dorsal connection point of the fall-protection harness so that the energy-absorbing unit remains connected to the fall-protection harness; and wherein the energy-absorbing unit comprises a total elongate length of from 8 inches to 24 inches. Embodiment 18 is the method of embodiment 17 wherein when the energy-absorbing unit is not connected to the cable of the self-retracting lifeline, the energy-absorbing unit hangs down at least generally vertically downward from the dorsal connection point of the fall-protection harness. Embodiment 19 is the method of any of embodiments 17-18 further comprising a subsequent step of reconnecting the second modular connector to which the first end of the energy-absorbing unit is attached, to the first modular connector to which the end of the cable is attached, so that the energy-absorbing unit is reconnected to the cable of the self-retracting lifeline. Embodiment 20 is the method of any of embodiments 17-18 further comprising a subsequent step of connecting the second modular connector to which the first end of the energy-absorbing unit is attached, to a first modular connector to which the end of a cable of a second self-retracting lifeline is attached, so that the energy-absorbing unit is connected to the cable of the second self-retracting lifeline. Embodiment 21 is the method of any of embodiments 15-20, performed using a self-retracting lifeline, fall-protection system, harness and/or kit of any of embodiments 1-15.

It will be apparent to those skilled in the art that the specific exemplary elements, structures, features, details, configurations, etc., that are disclosed herein can be modified and/or combined in numerous embodiments. All such variations and combinations are contemplated by the inventor as being within the bounds of the conceived invention, not merely those representative designs that were chosen to serve as exemplary illustrations. Thus, the scope of the present invention should not be limited to the specific illustrative structures described herein, but rather extends at least to the structures described by the language of the claims, and the equivalents of those structures. Any of the elements that are positively recited in this specification as alternatives may be explicitly included in the claims or excluded from the claims, in any combination as desired. Any of the elements or combinations of elements that are recited in this specification in open-ended language (e.g., comprise and derivatives thereof), are considered to additionally be recited in closed-ended language (e.g., consist and derivatives thereof) and in partially closed-ended language (e.g., consist essentially, and derivatives thereof). To the extent that there is any conflict or discrepancy between this specification as written and the disclosure in any document that is incorporated by reference herein but to which no priority is claimed, this specification as written will control.

What is claimed is:

1. A self-retracting lifeline fall-protection apparatus comprising:

a base unit comprising a housing and a reel that is rotatably connected to the housing;

a load-bearing cable with a first end that is attached to the reel of the base unit of the self-retracting lifeline and with a second end that is attached to a first modular connector;

and, an energy-absorbing unit comprising an energy absorber with a first end to which is attached a second modular connector that is disconnectably connected to the first modular connector and with a second, opposing end to which is attached a fastener that is configured to be fastened to a dorsal connection point of a fall-protection harness.

2. The self-retracting lifeline of claim 1 wherein the energy absorber comprises at least one elongate length of webbing comprising at least one elongate portion that is folded upon itself multiple times to form overlapping sections at least some of which are joined to each other.

3. The self-retracting lifeline of claim 2 wherein a first terminal portion of a first end of the elongate length of webbing passes through a through-opening of the second modular connector and is turned back on itself and attached to itself thereby causing the second modular connector to be attached to the first end of the energy absorber.

4. The self-retracting lifeline of claim 2 wherein a second terminal portion of a second, opposing end of the elongate length of webbing passes through a through-opening of the fastener and is turned back on itself and attached to itself thereby causing the fastener to be attached to the second end of the energy absorber.

5. The self-retracting lifeline of claim 1 wherein the fastener that is attached to the second end of the energy absorber is a hook.

6. The self-retracting lifeline of claim 1 wherein the dorsal connection point comprises a dorsal D-ring.

7. The self-retracting lifeline of claim 1 wherein the first modular connector is a male modular connector and the second modular connector is a female modular connector.

8. The self-retracting lifeline of claim 7 wherein the first modular connector comprises a loop portion from which a male member of the first, male modular connector extends, wherein the loop portion defines a through-opening, and wherein a terminal portion of the second end of the cable passes through the through-opening of the loop portion and is turned back on itself and attached to itself thereby causing the second end of the cable to be attached to the first, modular connector.

9. The self-retracting lifeline of claim 1 wherein the first and second modular connectors are configured to allow automatic engagement of the first and second connectors into a connected condition and to require the second modular connector to be actuated into an unlocked state before the first and second modular connectors can be disengaged into a disconnected condition.

10. The self-retracting lifeline of claim 1 wherein the first modular connector is a female modular connector and the second modular connector is a male modular connector.

11. The self-retracting lifeline of claim 1 wherein the energy-absorbing unit is configured to comprise a total elongate length, including the length of the energy absorber, the second modular connector and the fastener, of from 8 inches to 24 inches.

12. A fall-protection system comprising the self-retracting lifeline of claim 1 and a fall-protection harness configured to be worn by a human user, wherein the fastener of the energy-absorbing unit is fastened to a dorsal connection point of the fall-protection harness so that the cable of the self-retracting lifeline is connected to the fall-protection harness.

13. A kit comprising the self-retracting lifeline of claim 1 and further comprising at least one additional energy-absorbing unit that is identical to the energy-absorbing unit of claim 1 but that is not connected to the self-retracting lifeline.

14. A self-retracting lifeline fall-protection apparatus comprising:

a base unit comprising a housing and a reel that is rotatably connected to the housing;

a load-bearing cable with a first end that is attached to the reel of the base unit of the self-retracting lifeline and with a second end that is attached to a first modular connector;

and, an energy-absorbing unit comprising an energy absorber with a first end to which is attached a second modular connector that is disconnectably connected to the first modular connector and with a second, opposing end to which is attached a fastener that is configured to be fastened to a dorsal connection point of a fall-protection harness;

wherein the first modular connector and the second modular connector are a pair of complementary modular connectors, with the first modular connector not being connectable to any connector other than the second modular connector and with the second modular connector not being connectable to any connector other than the first modular connector.

* * * * *